J. WIKSCHTRÖM.
MACHINE FOR MAKING NAILS OR PINS FROM WIRE.
APPLICATION FILED JAN. 26, 1914.
1,246,513.
Patented Nov. 13, 1917.
5 SHEETS—SHEET 1.
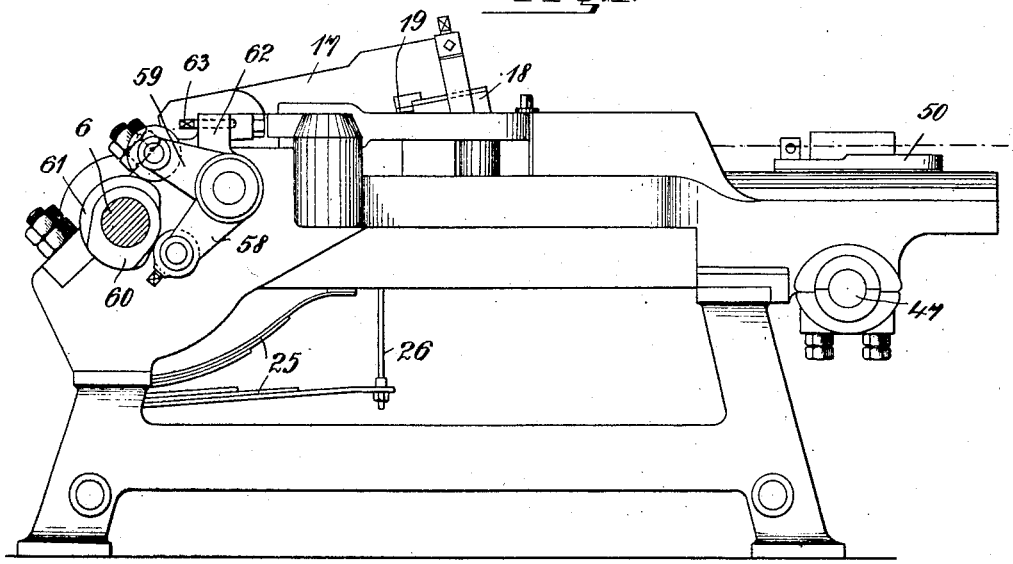
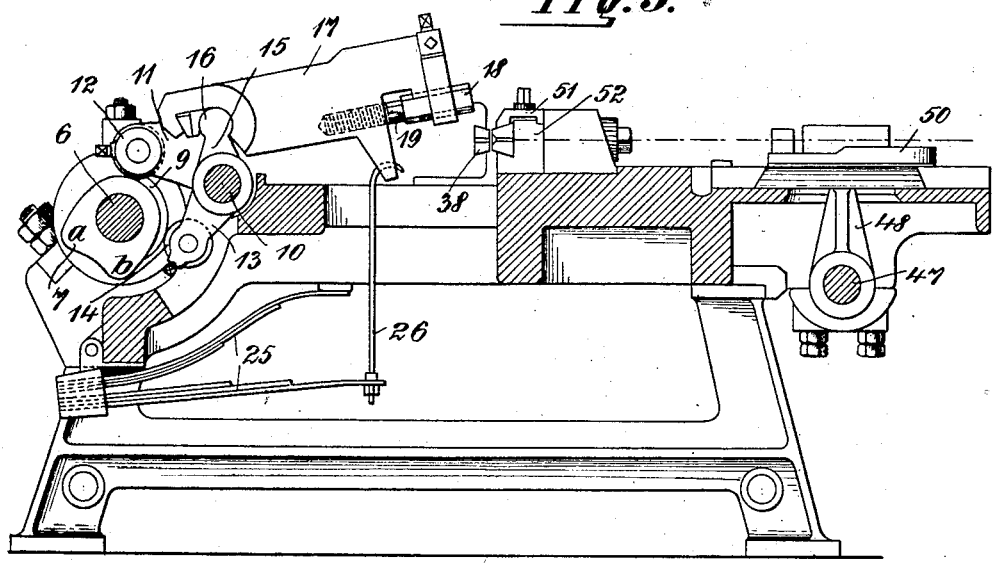

J. WIKSCHTRÖM.
MACHINE FOR MAKING NAILS OR PINS FROM WIRE.
APPLICATION FILED JAN. 26, 1914.

1,246,513.

Patented Nov. 13, 1917.
5 SHEETS—SHEET 2.

J. WIKSCHTRÖM.
MACHINE FOR MAKING NAILS OR PINS FROM WIRE.
APPLICATION FILED JAN. 26, 1914.

1,246,513.

Patented Nov. 13, 1917.
5 SHEETS—SHEET 3.

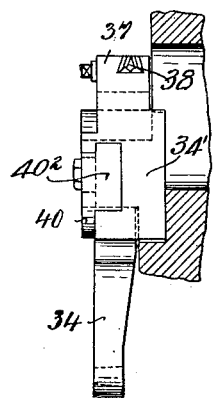
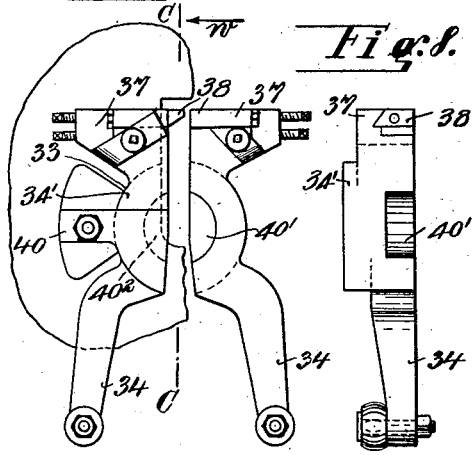
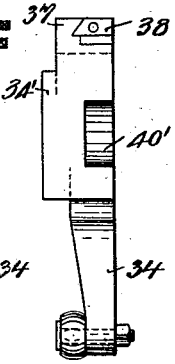
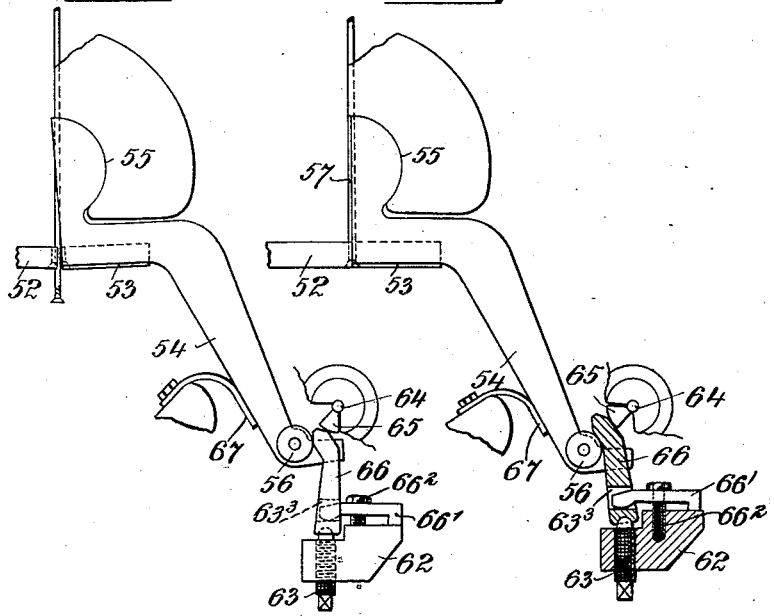

J. WIKSCHTRÖM.
MACHINE FOR MAKING NAILS OR PINS FROM WIRE.
APPLICATION FILED JAN. 26, 1914.
1,246,513.
Patented Nov. 13, 1917.
5 SHEETS—SHEET 5.
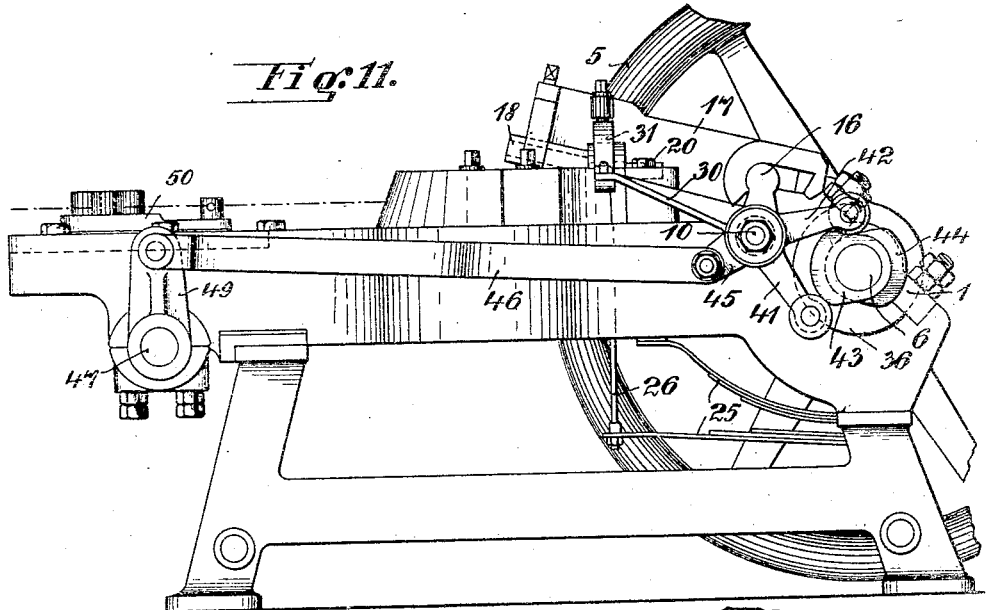
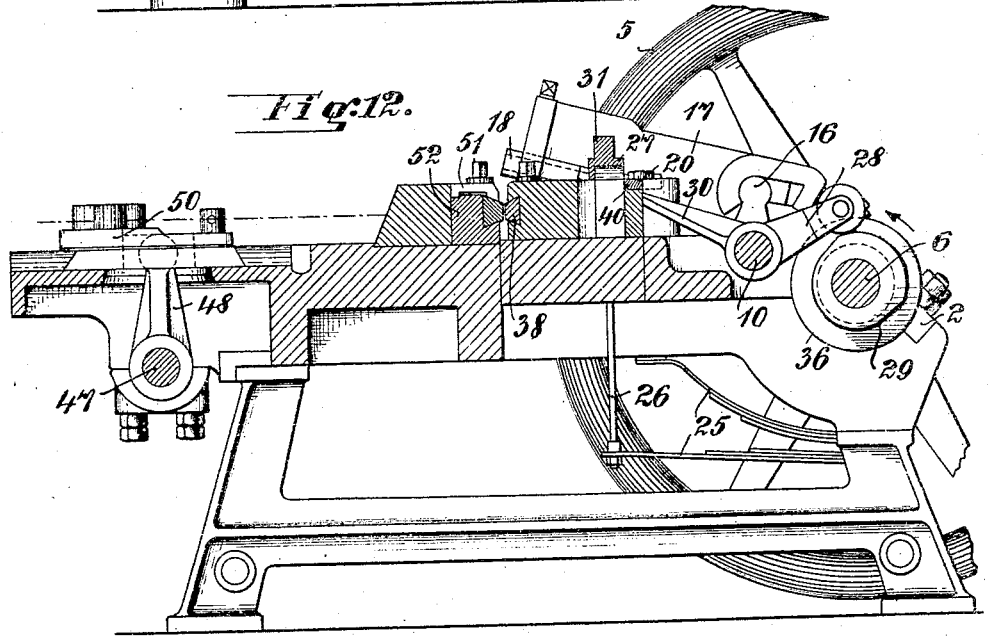

UNITED STATES PATENT OFFICE.

JAKOB WIKSCHTRÖM, OF DUSSELDORF, GERMANY.

MACHINE FOR MAKING NAILS OR PINS FROM WIRE.

1,246,513. Specification of Letters Patent. Patented Nov. 13, 1917.

Application filed January 26, 1914. Serial No. 814,487.

*To all whom it may concern:*

Be it known that I, JAKOB WIKSCHTRÖM, a citizen of the German Empire, residing at Dusseldorf, in the Kingdom of Prussia, Germany, have invented certain new and useful Improvements in Machines for Making Nails or Pins from Wire; and I do hereby declare the following to be a full, clear, and exact description of the invention, such as will enable others skilled in the art to which it appertains to make and use the same.

My invention relates to improvements in machines for making nails or pins from wire, and the object of the improvements is to provide a machine which is simple in construction and reliable in operation. With this and other objects in view my invention consists in the matters described hereinafter and particularly pointed out in the appended claims.

For the purpose of explaining the invention an example embodying the same has been shown in the accompanying drawings, in which the same letters of reference have been used in all the views to indicate corresponding parts.

In said drawings—

Figure 1, is a side view of the machine,

Figure 2:
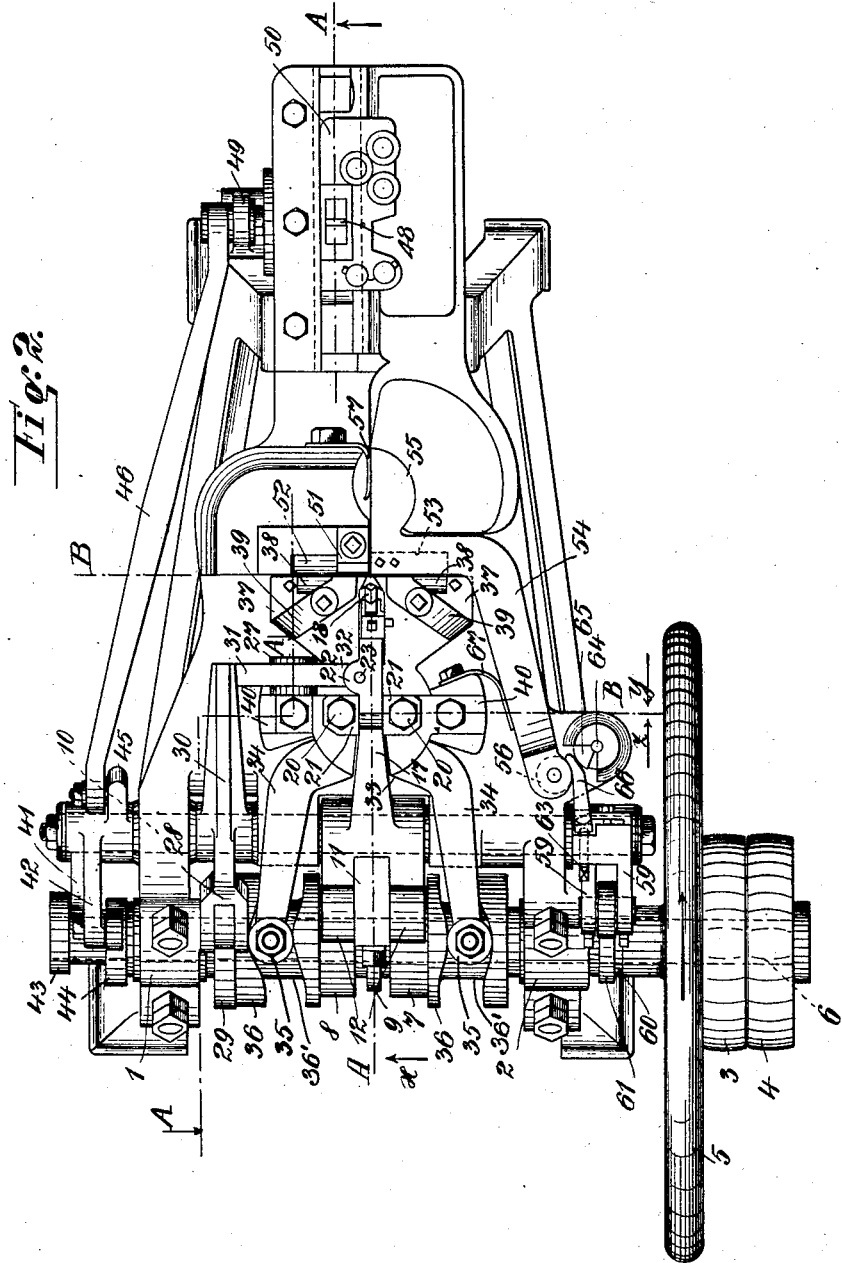
Fig. 2, is a plan view thereof.
Figure 4:
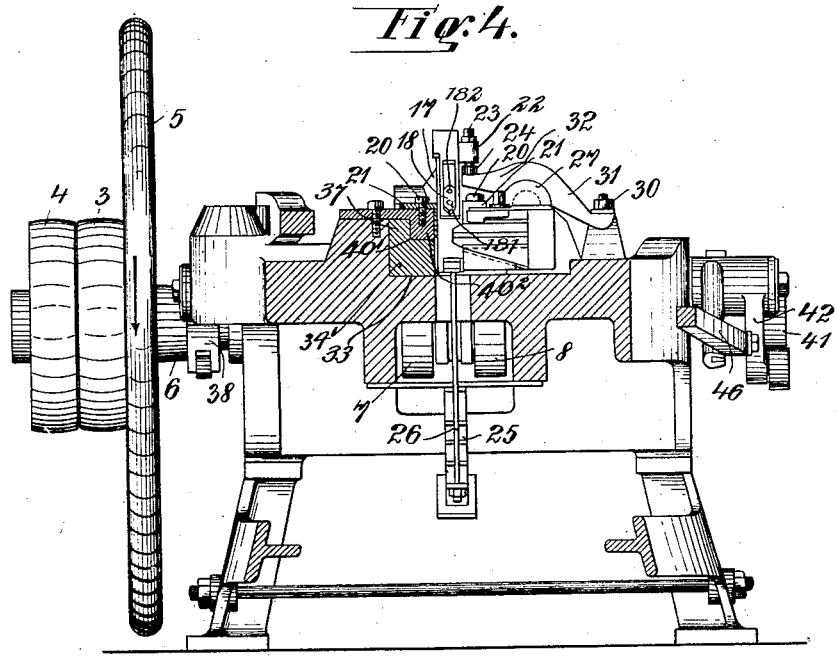
Figure 5:
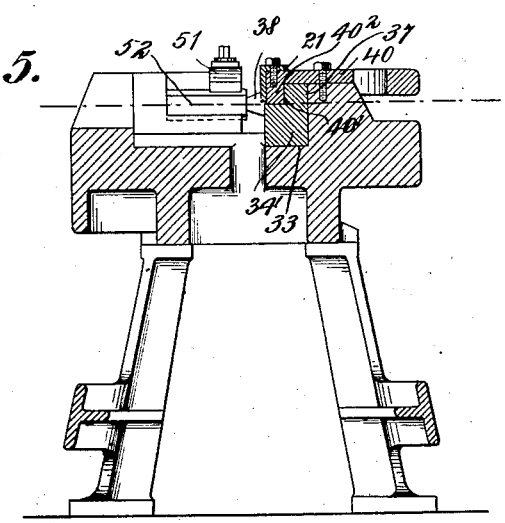

Fig. 3, is a longitudinal section taken on the line A—A of Fig. 2 and seen in the direction of the arrow $x$, Fig. 4, is a section taken on the line B—B of Fig. 2 and seen in the direction of the arrow $y$, Fig. 5, is a similar section seen in the direction of the arrow $z$, Fig. 6, is an enlarged detail view showing the levers, the cutters and their bearings, Fig. 7, is a section taken on the line C—C of Fig. 6 and seen in the direction of the arrow $w$, Fig. 8, is a side view of one of the levers carrying the cutters, Figs. 9 and 10, show the lever which carries the movable clamping jaw and the mechanism for operating the same.

Fig. 11, is a side view of the machine seen from the rear in Fig. 2, and

Fig. 12, is a longitudinal section of the machine taken on the line A—A of Fig. 2.

In the example shown in the drawings the machine consists of a frame comprising bearings 1 and 2 for a main shaft 6, on which a fixed pulley 3, a loose pulley 4 and a fly wheel 5 are mounted. Between the bearings 1 and 2 the shaft 6 carries two cam disks 7 and 8 of equal form, and between the said cam disks a third cam disk 9 is provided the cam face of which is different from that of the disks 7 and 8. Adjacent to the main shaft 6 and parallel thereto a rock shaft 10 is mounted in bearings of the machine frame, to which a bell crank lever having three arms 11, 13, 15 is keyed, the medium arm 11 carrying at its end lateral rollers 12 adapted to roll on the cam disks 7 and 8 respectively, and the lower arm 13 carrying a roller 14 engaged by the cam disk 9. The cam faces of the disks 7 and 8 and the cam face of the disk 9 correspond to each other in such a way, that they impart positive rocking movement to the bell crank lever. The third arm 15 of the bell crank lever is constructed at its end with a rounded head 16 which is located in its medium position above the shaft 10. On the pivot 16 an arm 17 has a rocking support, the end of which carries the heading punch 18 which is adapted to be adjusted in longitudinal direction by a screw 19. The bearing of the arm 17 which engages the head 16 is provided in the upper part of the horizontal arm 17, and the punch 18 is provided at the opposite end of the said arm and at the lower end thereof.

Lateral guides are provided for the arm 17 by means of angle bars 21 secured to the frame by screws 20, as is best shown in Fig. 4. At the side of the arm 17 a lug 22 is provided to which a screw 23 is secured which carries at its lower end a disk 24. To the lower part of the frame of the machine springs 25 are secured which are connected at their ends with the arm 17 by links 26 and tend to pull the said arm downward. At a right angle to the arm 17 a rocking lever 31, 32 is mounted on a semicircular pivot 27 secured to the frame of the machine. On the shaft 10 a rocking lever 28, 30 is loosely mounted, the arm 28 of which is adapted to be rocked in vertical direction by a cam disk 29 keyed to the main shaft 6. The arm 30 extends above the arm 31 of the two arm lever 31, 32 mounted on the pivot 27. The other arm 32 of the said lever extends below the disk 24, as is best shown in Fig. 4.

In a circular cut-out portion 33 of the frame of the machine two rocking levers 34, 37 are mounted, the arms 34 of which are directed toward the main shaft 6 and are equipped with rollers 35 engaging in cam grooves 36' of drums 36 mounted on the shaft 6 and adapted to be rocked by the said drums. The other arms 37 of the said levers carry cutters 38 by means of which the nails are pointed. The center of the cut-out portion 33 is located in the axis of the wire being fed to the operative parts of the machine. The medium parts 34' of the double levers are made semi-cylindrical according to the cut-out portion 33 and in the form of hubs, and they bear at opposite sides on the walls of the cut-out portion 33. At their upper sides the said parts are slightly notched as shown at 40' and clamping plates 40 secured to the frame of the machine extend with substantially semi-cylindrical portions 40² into the said notched portions and close the bearings for the levers at the upper sides and hold the same in position, as is shown in Figs. 4, 5, 6, 7 and 8. The semi-cylindrical hub portions 34' are made integral with the arms 34 and 37 which are provided at opposite sides. The plates 39 close the bearings of the blades.

As appears from Figs. 2 and 4 to 6, the rocking levers 34, 37 are disposed with their adjacent sides at a distance from each other so as to provide a free space through which the heading punch 17 can be rocked downward and in heading position relatively to wire clamping means to be described hereinafter.

At the end of the shaft which is opposite to the pulleys 3 and 4 and the fly wheel 5 a bell crank lever is secured to the shaft which consists of three arms 41, 42 and 45. The arms 41 and 42 are provided with rollers engaged by cam disks 43 and 44, by means of which positive rocking movement can be imparted to the bell crank lever. To the third arm 45 a link 46 is jointed by means of which the rocking movement of the bell crank lever is transmitted to a shaft 47 which for this purpose carries a crank arm 49 jointed to the link 46. A second crank arm 48 is provided on the shaft 47 for transmitting the rocking movement of the shaft to a wire feeding device 50 provided on the frame of the machine and constructed in any known or preferred way.

In front of the cutter 38 and below a plate 51 a stationary clamping jaw 52 is provided, which is adapted to coöperate with a movable clamping jaw 53 embedded within a rocking lever 54 disposed with its semi-cylindrical end in a circular cut-out portion 55 of the machine frame, the center of which is located in the axis of the wire being fed to the operative parts of the machine. The opposite end of the lever carries a roller 56. A spring 57 is provided for forcing the lever 54 in contact with its bearing provided by the cut-out portion 55, and a spring 67 acting on the opposite end of the lever tends to rock the same outward. This construction is best shown in Figs. 9 and 10.

Laterally of the fly wheel 5 a bell crank lever having three arms 58, 59, and 62 is mounted. The arms 58 and 59 engage cam disks 60 and 61 secured to the main shaft 6 and impart positive rocking movement to the bell crank lever. On the arm 62 a block 66 is mounted, which is adapted to be adjusted by means of an adjusting screw 63. The block is held in position by means of a clamping arm 66' engaging in a hole 63ª made in the block and adapted to be forced in clamping engagement by a screw 66². By setting the screws 63 and 66² the block 66 can be adjusted forward and backward, as will readily be understood from Figs. 9 and 10.

The operation of the machine is as follows:

At the beginning of the operation the arm 17 which carries the heading punch is in the position shown in Figs. 1, 3, 4, 11 and 12. The arm 28 is engaged by a bulged portion of the cam 29 and has been rocked upward, while the arm 30 has been lowered. As the arm 30 extends above the arm 31 of the transverse rocking lever 31, 32, the arm 31 is also in depressed position, while the arm 32 is in elevated position. As the arm 32 engages below the disk 24 of the lug 22 secured to the arm 17, the arm 17 is held in elevated position against the action of the springs 25.

If now the wire is advanced by means of the feeding mechanism 50, the movable clamping jaw 53 is forced into engagement with the stationary jaw 52 so as to clamp the wire. This is done in the following way:

The cam disk 61 rocks the lever 59 upward and the arm 62 to the right in Fig. 1, whereby the block 66 is forced forward. At the beginning of the movement the block 66 and a sector 65 have the positions shown in Fig. 9. The spring 67 acting through the lever 54 forces the roller 56 against the block 66 and the sector 65.

If now the block 66 is advanced the sector 65 is rocked, the block rocking the sector. Thereby the lever 54 is forced inward and with the clamping jaw 53 into clamping engagement with the stationary jaw 52. The block 66 is advanced so far that the parallel surfaces provided behind its wedged part are between the sector 65 and the roller 56, so that the pressure of lever 54 does not act any more on lever 62, but is transmitted through the sector 65 to the frame of the machine, as is shown in Fig. 10. Therefore there is no pressure on the roller of the lever 59.

After the wire has thus been clamped the levers 34 which are guided in the grooves 35 of the disks 36 are rocked outward, so that the arms 37 which carry the cutters 38 are forced into engagement with each other so as to form the point of the nail.

After a finished nail has been dropped from the dies 52, 53, a short length of wire projects, which is used for forming the head of the next nail.

After the cutters have been separated again, the arm 17 is moved downward by a flat portion of the cam disk 29 engaging below the arm 28, so that the said arm is rocked downward and the arm 30 is moved upward. Thereby also the arm 31 is free to be rocked upward, and the arm 17 can be rocked downward by the springs 25. The downward movement is temporarily arrested when the lower part of the heading punch which is formed with a heading die 181 is in front of the wire.

In the meantime the cam disk 7 has been turned so far, that a portion $a$ of increasing radius gets in engagement with the roller of arm 12, so as to rock the same upward and to move the arm 15. Thereby arm 17 is moved in a direction toward the jaws 52, 53, whereby a preliminary heading is performed.

After the portion $a$ of the cam disk has passed the arm 12, the latter is returned a short distance, whereupon the arm 17 is rocked farther downward by the operation of the cam 29, so that the part 182 of the punch which is provided for finishing the head of the nail is in front of the wire which has undergone the preliminary heading.

Now the portion $b$ of the cam disk, the radius of which is increasing, comes into action and rocks the arm 12 upward, so that the arm 15 is moved which moves the arm 17 again toward the jaws 52, 53 and completes the heading operation.

After the arm had been returned it was forced upward by the cam disk 29 against the action of the springs 25. The cam disk 61 returns the arm 62 and retracts the block 66, whereby also the sector 65 is allowed to return into initial position. The lever 54 is forced by the spring 67 in the direction toward the sector 65, so that the clamping jaw 53 is separated from the jaw 52.

Now the wire is again fed, cut, and headed in the manner described above.

By means of the adjusting screw 63 the block 66 can be set in different positions. Thereby the opening of the jaws can be set exactly according to the thickness of the wire.

The heading punch 18 can be set at different heights by means of the screw 23, while it can be set in longitudinal direction by means of the screw 19.

By the downward stroke of the arm 17 a nail which might still be attached to the end of the wire is separated therefrom.

Instead of a double acting heading punch for performing at first a preliminary heading and thereafter finishing the nail, a single acting punch may be provided which heads the nail by a single stroke.

The method of mounting the levers carrying the cutters is advantageous in this respect, that the said cutters are guided in a reliable way. As the bearing surfaces of the said levers are very large and the pressure is directly taken up by the frame of the machine, the wear of the said surfaces is reduced to a minimum.

By disposing the fulcrum 16 of the arm 17 which carries the heading punch above the punch 18, the said arm cannot be rocked upward by the heading operation. The arm is advanced in a horizontal direction, but the pressure acts downward and rearward.

I claim herein as my invention:

1. In a wire nail machine, the combination with a wire clamping mechanism, of a heading punch comprising an arm having a plurality of heading dies thereon, means to move the arm to bring the dies successively into operative position relatively to the wire, and a bell crank partially supporting said arm and operating to actuate the punch in its successive positions.

2. In a wire nail machine, the combination with a wire clamping mechanism, of a heading punch comprising an arm having a preliminary heading die and a finishing die superposed on its free end, means to move the arm to bring the dies successively into operative position relatively to the wire, a bell crank on which said arm is pivoted and means to oscillate the lever to reciprocate the punch when the dies are in their operative positions.

3. In a wire nail machine, the combination with a wire feeding mechanism and a wire clamping mechanism, of a bell crank lever, a punch arm pivoted on one arm of said lever, superposed dies on the free end of the punch arm, means to impart a step by step movement to the latter in a vertical plane, and means to rock the lever to reciprocate said punch arm longitudinally at each step of its movement.

4. In a wire nail machine, the combination with a wire feeding mechanism, and a wire clamping mechanism, of a punching mechanism comprising an oscillatory three armed bearing member, an arm pivoted on one arm of the latter, superposed dies on the free end of the pivoted arm, means to impart a step by step vertical movement to the pivoted arm to bring the dies successively into operative position, and means to oscillate the bearing member at each step of the arm.

5. In a wire nail machine, the combination with a wire feeding mechanism, and a wire clamping mechanism, of a punching mechanism comprising an oscillatory bearing member, an arm pivoted on the latter at one end near the upper edge of the arm, a finishing die and a superposed preliminary die on the free end of the arm near the lower edge thereof, means to swing the arm in a vertical plane and to arrest the same in different horizontal planes to successively bring the preliminary and finishing dies into operative relation with the wire, and means to oscillate the bearing member to reciprocate the arm in its arrested positions.

6. In a machine for making nails, pins, and the like from wire, the combination with a heading punch having a heading face, and wire feeding means, of a rocking lever engaging said heading punch and adapted to set the same with different parts of its heading face in heading position relatively to the wire, a bell crank lever operating said rocking lever, a rotary member comprising two cam faces acting on the arms of the bell crank lever and adapted to impart positive rocking movement thereto, and springs tending to move the heading punch in opposition to its setting means.

7. In a machine for making nails, pins, and the like from wire, the combination with a heading punch having a heading face, and wire feeding means, of a rocking lever engaging said heading punch and disposed at a right angle thereto and adapted to set the same with different parts of its heading face in heading position relatively to the wire, a bell crank lever operating said rocking lever, a rotary member comprising two cam faces acting on the arms of the bell crank lever and adapted to impart positive rocking movement thereto, and springs tending to move the heading punch in opposition to its setting means.

8. In a machine for making nails, pins, and the like from wire, the combination with the machine frame, wire feeding means, and heading means, of wire clamping means comprising a rocking member the pivotal axis of which intersects the longitudinal axis of the wire being fed.

9. In a machine for making nails, pins, and the like from wire, the combination with the machine frame, wire feeding means, and heading means, of wire clamping means comprising a rocking member the pivotal axis of which intersects the longitudinal axis of the wire being fed, the pivot of the said member being provided by the cylindrical rear face of the member engaging in a corresponding cut-out portion of the machine frame.

In testimony whereof I hereunto affix my signature in the presence of two witnesses.

JAKOB WIKSCHTRÖM. [L. S]

Witnesses:
JOHANNES WAGNER,
FRANZ KIMMER RAMP.

Copies of this patent may be obtained for five cents each, by addressing the "Commissioner of Patents, Washington, D. C."